Nov. 19, 1935.  F. R. HEMPHILL  2,021,600
HOSE SUPPORTER
Filed Sept. 22, 1934
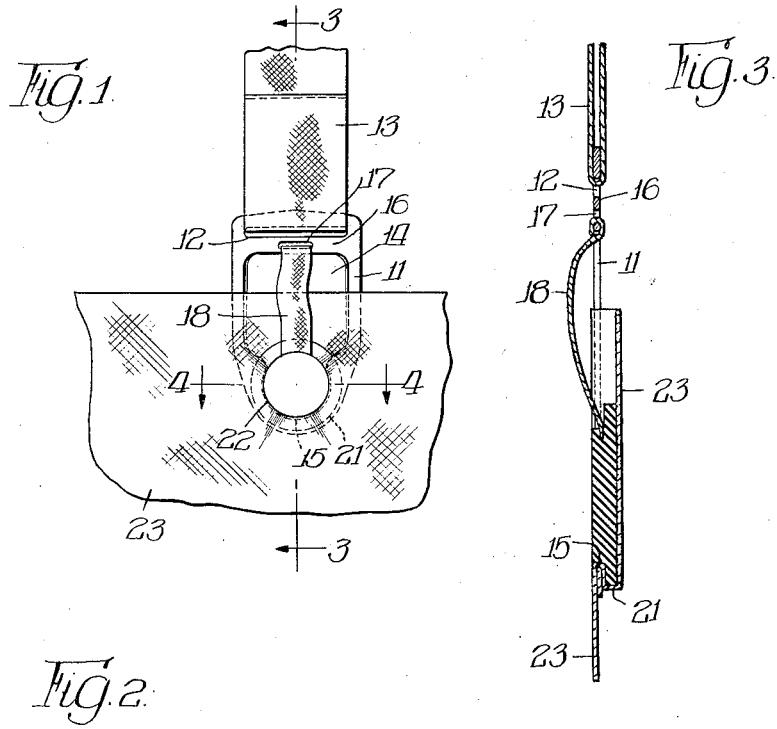
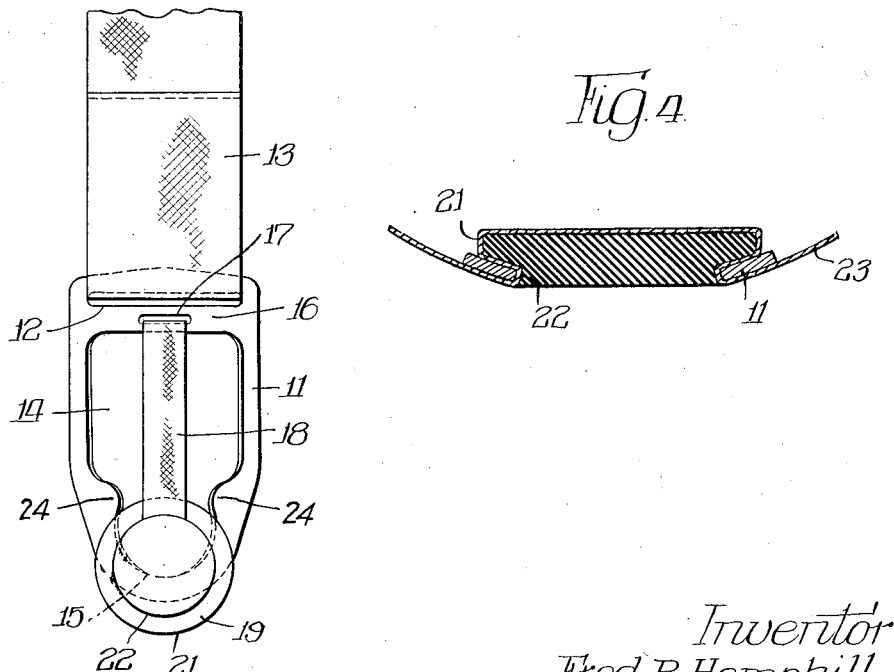
Inventor:
Fred R. Hemphill,
By Walter M. Fuller
atty.

Patented Nov. 19, 1935

2,021,600

UNITED STATES PATENT OFFICE 2,021,600

HOSE SUPPORTER

Fred R. Hemphill, Chicago, Ill.

Application September 22, 1934, Serial No. 745,017

5 Claims. (Cl. 24—245)

My invention pertains to certain features of betterment and advantage in hose-supporters and analogous appliances.

One of the leading aims and prime purposes of the invention is the provision of a device of this general character which is relatively flat and without projections or protuberances, whereby the presence of the supporter is not apparent when used under garments of thin and sheer fabric.

A further object of the invention is to supply a hose-supporter which clamps or clasps the hose or stocking securely without danger of detachment and which does not injure the fabric of which the hose is made even when the device is used with silk of very thin properties.

An added important feature of the invention resides in the fact that a hose or garter supporter embodying the invention may be manufactured at a small cost and hence may be sold for a relatively small amount.

Still another object of the invention is the provision of a garter-fastener which is composed of a few parts, which may be manipulated with ease and dispatch, and which is unlikely to become unintentionally detached from the hose under ordinary bodily movements of the wearer.

For the attainment of these and other desirable aims, I have devised the present preferred embodiment of the invention illustrated in the accompanying drawing forming a part of this specification and to which reference should be had in connection with the following detailed description, like reference numerals, for simplicity, being employed to designate the same parts throughout the several views.

In this drawing:—

Figure 1 is a face view of the hose supporter showing it attached to the stocking;

Figure 2 is a similar view of the structure before it is applied to the hose;

Figure 3 is a lengthwise section on line 3—3 of Figure 1; and

Figure 4 is a cross-section on line 4—4 of Figure 1.

Figure 1 is approximately full size, Figure 2 being on a somewhat larger scale, Figure 3 on a still larger scale, and Figure 4 additionally larger in order to depict more clearly the details of construction.

By reference to these illustrations, it will be noted that the garter structure or hose supporter comprises a frame 11 which may be of metal or of any other appropriate material and which at one end has a transverse slot 12 by means of which it may be readily attached to the usual supporting elastic webbing 13 in the customary manner.

As is fully depicted, this frame has an opening therethrough with an upper, enlarged section 14 communicating directly with a lower, narrower section 15 in the form of a portion of a circle, opening section 15 being slightly contracted at its junction at 24, 24 with the lower portion of the upper section 14 of the opening.

A cross-bar 16 of the frame between the openings 12 and 14 has a small slot 17 affording a convenient and simple means for the attachment of the upper end of a tape or ribbon 18, the lower end of which is moulded in, or otherwise secured in or to, a rubber or other suitable retainer, fastener, or button 19 comprising a thin, round base 21, somewhat larger than the diameter of the opening 15, and a round stem or stud 22 of substantially the same, or slightly less, diameter than such aperture 15 and of a thickness corresponding generally to that of the frame 11.

The upper margin or border portion of the hose or stocking 23 adapted to be held by such novel and improved supporter is shown fragmentarily in Figures 1, 3, and 4.

To apply the supporter or fastener to the stocking or hose, the apertured member or frame 11 is inserted behind the top portion of the hose, the stud or button 21—22 is placed in front of the hose over the opening 14 and substantially parallel to the frame, whereupon such stud or button is then pushed rearwardly through the opening and behind the frame, while substantially maintaining such parallelism, and carrying the corresponding portion of the stocking with it.

Then the frame is drawn or pulled up until the stud with that portion of the stocking around it is properly seated in the opening 15, clamping the hose between itself and the wall of the opening, and between the part 21 of the button and the inner surface of the frame, as presented in Figure 4.

When thus attached to the stocking, the appliance is relatively flat without any knobs, heads, or projections to prevent an unpleasing or unsightly appearance.

Due to the slight constriction at 24, 24 of the frame opening, there is little likelihood of the stud sliding upwardly into the major portion of the frame aperture and releasing the holding grip on the stocking.

Whereas the button may be said to have a base 19 and a stem 22, it has no head, and, conversely, if the part 19 be considered as a head, the button has no base.

This one-piece or integral stud or button may be manufactured at substantially less cost than the usual present-day studs of metal and rubber combined, and, of course, my novel button or stud is much flatter.

Also, due to the fact that my improved button or stud is quite thin, it may be made wider than the usual ones without appearing bulky, and with such larger size the strain at any point on the stocking fabric is correspondingly lessened with resulting diminution of likelihood of runs or tears.

Those acquainted with this art will readily understand that the invention, as presented in the appended claims, is not necessarily limited and restricted to all of the precise details shown and described and that various modifications may be resorted to without departure from the heart and essence of the invention and without the loss or sacrifice of any of its material benefits or advantages.

I claim:

1. In a supporter, the combination of a frame having a hole therethrough with a larger upper portion connecting with a lower smaller portion, a headless button having a thin base larger than said lower portion of said opening and a stem of approximately the thickness of said frame and of a size and shape slightly smaller than said lower opening portion, and a flexible member connecting said button with said frame, whereby said frame may be placed back of the hose or other article with the button and connecting member in front thereof and then the button may be pushed back through the larger upper portion of said frame opening carrying the registering portion of the fabric with it, whereupon the frame may be pulled up until the stem of the button occupies the lower smaller portion of said opening clamping the fabric between the edge of itself and the frame, the base of said button and the fabric covering the same lying flat against the back side of the frame.

2. The structure presented in claim 1 in which the stem of said button is made of resilient material.

3. The structure presented in claim 1 in which said button is made of resilient rubber.

4. The structure presented in claim 1 in which said button is made of rubber moulded around the lower end of said connecting member.

5. The structure presented in claim 1 in which there is a slight constriction in the frame opening substantially at the junction of its two upper and lower sections, whereby to assist in maintaining the stud in the lower section of such opening.

FRED R. HEMPHILL.